United States Patent
Parison, Jr. et al.

(10) Patent No.: US 8,466,639 B2
(45) Date of Patent: Jun. 18, 2013

(54) MOTION CONTROL SYSTEM SELF-CALIBRATING

(75) Inventors: James A. Parison, Jr., New Ipswich, NH (US); Tyson Curtis Coey, Townsend, MA (US); Antonio Sangermano, II, Rindge, NH (US); Yongkai Xu, Waltham, MA (US)

(73) Assignee: Bose Corporation, Framingham, MA (US)

(*) Notice: Subject to any disclaimer, the term of this patent is extended or adjusted under 35 U.S.C. 154(b) by 717 days.

(21) Appl. No.: 12/646,371

(22) Filed: Dec. 23, 2009

(65) Prior Publication Data
US 2011/0148331 A1    Jun. 23, 2011

(51) Int. Cl.
*H02P 1/24*    (2006.01)

(52) U.S. Cl.
USPC ........... 318/244; 318/668; 318/720; 318/721; 318/263

(58) Field of Classification Search
USPC ................ 318/560, 566, 626, 651, 652, 668, 318/400.38, 720, 721, 244, 254.1, 263, 437, 318/466, 467, 468
See application file for complete search history.

(56) References Cited

U.S. PATENT DOCUMENTS

| | | | |
|---|---|---|---|
| 5,124,625 A * | 6/1992 | Wakabayashi | 318/603 |
| 5,376,870 A * | 12/1994 | Ueda et al. | 318/603 |
| 6,470,225 B1 | 10/2002 | Yutkowitz | |
| 7,030,585 B2 * | 4/2006 | Iwashita et al. | 318/567 |
| 7,256,686 B2 | 8/2007 | Koutsky et al. | |
| 7,589,484 B2 * | 9/2009 | Sosseh et al. | 318/400.3 |
| 7,638,965 B2 * | 12/2009 | Miyazaki | 318/560 |
| 7,855,525 B2 * | 12/2010 | Sanders et al. | 318/466 |
| 7,868,577 B2 * | 1/2011 | Marushita et al. | 318/609 |
| 7,915,848 B2 * | 3/2011 | Iwashita et al. | 318/560 |
| 7,936,144 B2 * | 5/2011 | Vig et al. | 318/632 |
| 2002/0115043 A1 | 8/2002 | Baker et al. | |
| 2006/0095180 A1 | 5/2006 | Ummethala et al. | |

OTHER PUBLICATIONS

International Search Report and Written Opinion dated Apr. 19, 2011 for PCT/US2010/059710.

* cited by examiner

*Primary Examiner* — Eduardo Colon Santana
*Assistant Examiner* — Thai Dinh (57) ABSTRACT

A motion control system including components such as an accelerometer for detecting zero force positions and for self-calibrating the motion control system. The motion control system may be implemented in an active seat suspension.

31 Claims, 8 Drawing Sheets

MOTION CONTROL SYSTEM SELF-CALIBRATING

BACKGROUND

This specification describes an apparatus and method for self-calibrating a motion control system and for determining zero force positions of a phase of an electromechanical actuator.

SUMMARY

In one aspect a method for self-calibrating a motion control system, includes providing, by a position detector associated with the motion control system position information of an armature; providing a motion directing calibration signal of pre-determined frequency content, to cause a motion control system to provide current to a plurality of phases of a multiphase motor includes the armature; commutating current provided to the plurality of phases so that the net force with the pre-determined frequency content is zero if the actual position of the armature corresponds to the position information; and detecting motion, at the pre-determined frequency, of the armature resulting from the motion directing signal. The predetermined frequency content may include frequencies outside the normal range of operation of the motion control system. The detecting may include filtering an acceleration measurement according to the predetermined frequency content. The method for calibrating a motion control system may further include in the event that that motion resulting from the armature is detected, modifying the position information. The detecting may include measuring the acceleration of the armature. The detecting may include detecting audible vibration resulting from motion of the armature. The method may further include operating the motion control system in a conventional manner, the conventional manner including receiving as input a desired armature position; determining a motion that will cause the position indicated by the position information to match the desired armature position; determining a force required to effect the motion; and applying the required force to the armature.

In another aspect, a self calibrating motion control system includes: a motor includes an armature and a plurality of phases; a position sensor to provide position information of the armature; a calibration signal source to provide a signal directing a motion control system to provide current to the plurality of phases; a commutator to commutate current provided to the plurality of phases so that the net force resulting from the plurality of phases is zero if the actual position of the armature corresponds to the position information; and a motion detector to detect motion of the armature resulting from the motion directing signal. The self calibrating motion control system may include circuitry to modify the position information, and the commutator may further commutate current provided to the plurality of phases so that the net force resulting from the plurality of phases is zero if the actual position of the armature corresponds to the modified position information. The motion detector may include an accelerometer. The motion detector may include a microphone. The calibration device for use in a motion control system may include circuitry to modify the position information and the commutator may commutate current provided to the plurality of phases so that the net force resulting from the plurality of phases is zero if the actual position of the armature corresponds to the modified position information.

In another aspect, a method includes: applying, at a first frequency, a force to an armature of a motor to move the armature through a range of positions; determining, by a position sensor, an indicated position of the armature; exciting, at a frequency higher than the first frequency, a coil of the motor; and measuring the acceleration of the armature; filtering the acceleration of the armature to obtain a filtered acceleration measurement; and when the filtered acceleration measurement is zero, recording the indicated position. The applying may be performed by a linear actuator. The exciting may be performed by a first force source and the applying may be performed by a second force source. The second force source may be gravity. The filtering may include band pass filtering. The method may further include calculating the root mean squared value of the acceleration. The method may be implemented in an active vehicle seat suspension. The force may be applied by an air spring. The force may be applied to a plant mechanically coupled to the armature. The method may further include commutating the motor responsive to the measuring.

In another aspect, a motion control apparatus includes: a motor that includes an armature; a force source, distinct from the motor, for moving the armature through a range of motion; a position detector, for detecting the position of the armature; an accelerometer, for providing a measurement of the acceleration of the armature; a filter, for filtering the measurement; and circuitry for associating a detected position with an acceleration measurement of zero. The motion control apparatus may include a plant mechanically coupling the second force source and the armature. The filter may be a band pass filter. The motion control apparatus may further include circuitry for calculating the root mean squared value of the measurement of the acceleration. The motor may be a multiphase motor. The motion control apparatus may include commutating circuitry for commutating the motor responsive to the acceleration measurement.

In another aspect, an active vehicle seat suspension system, includes: a vehicle seat; an actuator for controlling the motion of the vehicle seat which includes an armature; a position detector to provide position information of the armature; and a self-calibration system for the active vehicle seat suspension. The self-calibration system includes a force source independent of the actuator to move the vehicle seat; a current source to provide current to the actuator at a predetermined frequency; a commutator to commutate the current so that the if the position information is accurate, the actuator applies a predetermined amount of force, and an accelerometer for measuring the acceleration of the armature; and a filter, for filtering the acceleration of the armature. The predetermined amount of force may be zero.

Other features, objects, and advantages will become apparent from the following detailed description, when read in connection with the following drawing, in which:

DETAILED DESCRIPTION

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The processes that are performed in each block may be performed by one element or by a plurality of elements, and individual steps of the process may be separated in time. The elements that perform the processes of a block may be physically separated. An element may perform the processes of more than one block.

Figure 1:
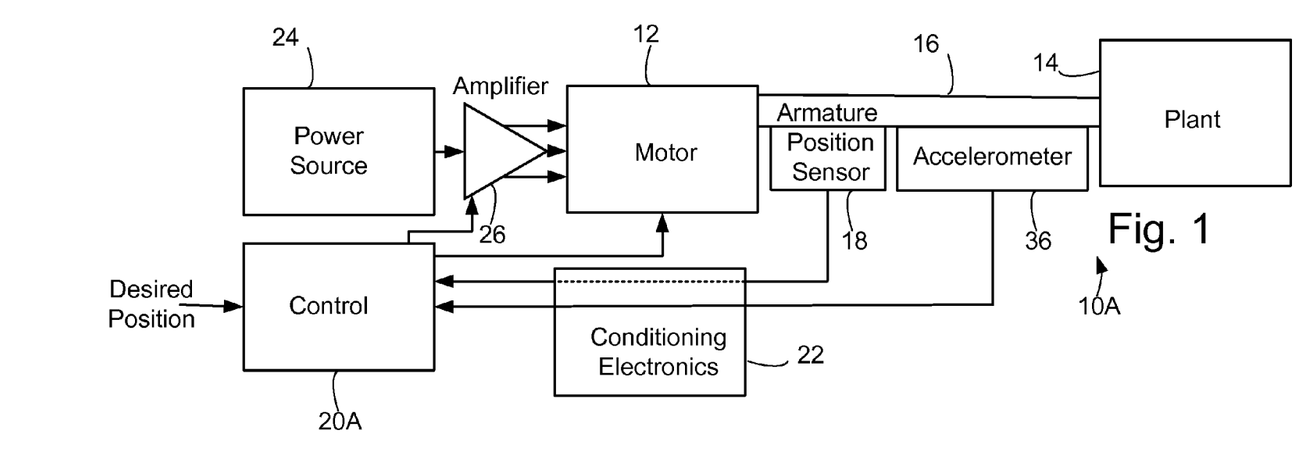
FIG. 1 is a block diagram of a motion control system.

FIG. 1 shows a motion control system 10A. The motion control system 10A includes an electromechanical transducing device such as a motor 12 that imparts motion to a plant 14. Typically, the motion is imparted by applying force to the plant through an armature 16. Alternatively the plant can be rigidly connected to the stator of the motor 12, and the armature rigidly connected to a stationary structure. A position sensor 18 is mechanically coupled to the plant 14 or to an element rigidly connected to the plant, for example in the implementation of FIG. 1, the armature 14. The position sensor 18 detects the position of the plant 14, and provides position information to control block 20A, in some examples through conditioning electronics 22. The control block 20A is coupled to the motor 12 and the amplifier 26 to control the distribution of current supplied by the amplifier and the direction and force applied by the motor 12. The three lines between amplifier 26 and motor 12 will be explained below, as will the accelerometer 36.

In conventional operation, the control block receives as input a desired position, and, from the position sensor 18 an actual position of the plant 14 or the armature 16. The control block 20A determines a motion that will cause the actual position to match the desired position and determines the force required to effect the motion. The control block transmits control signals to the amplifier 26, the motor 12, or both, to cause the motor to apply the desired force. Typically, the conventional operation of the motion control system 10A of FIG. 1 is performed over a range of frequencies, which will be referred to below as the "normal range of operation". For example, if the motion control system is used as an active vehicle seat, a typical normal range of operation is 0.1 Hz to 50 Hz. Components of the motion control system may be capable of operating at frequencies outside the normal range of operation of the motion control system so that the linear motor may be able to move the armature at frequencies outside the normal range of operation of the motion control system. For example, if the motion control system is used as an active vehicle seat and the normal range of operation is 0.1 Hz to 50 Hz, the linear motor may be able to respond to excitation signals of up to 1 kHz.

It is important that the position information provided by the position sensor 18 to the control block 20A be as accurate as possible. Offsets, drifts, or other inaccuracies, can occur due to flaws in system components, including the position sensor itself. Additional inaccuracies could result from other events or conditions, for example, mechanical misalignments or changes in magnetization of the armature due to mechanical or thermal shock. Accordingly, some method of calibrating the position sensing, processing, and transmission elements is desirable, particularly if the motion control system is designed so that one or more of the components is replaceable independently of the other components or if the motion control system is designed so that components are to be replaced in an environment (for example a vehicle maintenance facility) that may not have expensive calibration equipment.

Figure 2:
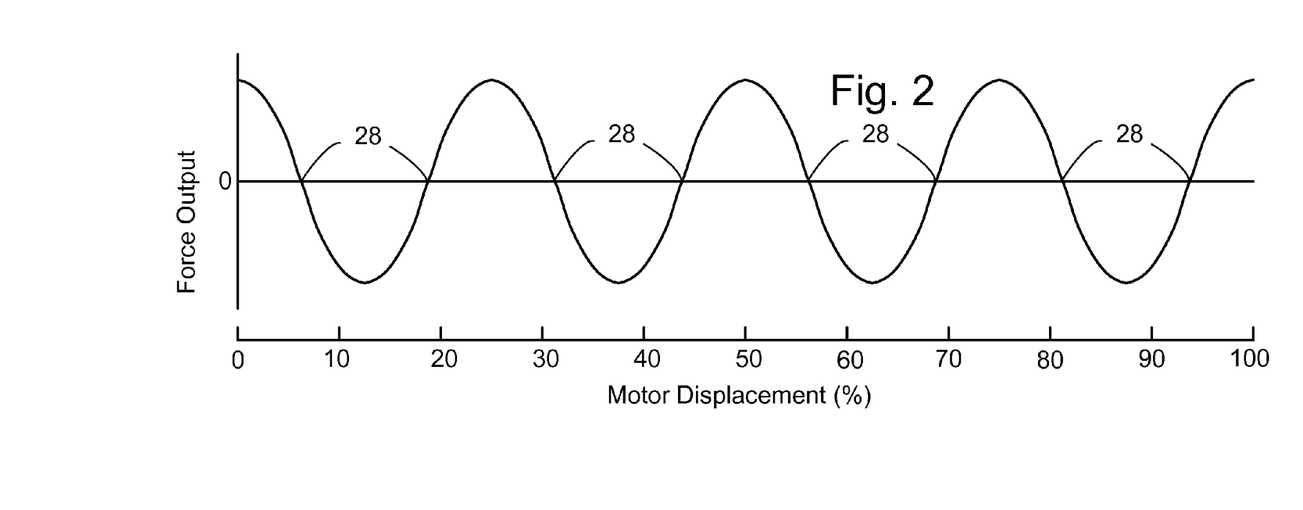
FIG. 2 is plot of force output vs. motor displacement.
Figure 3:
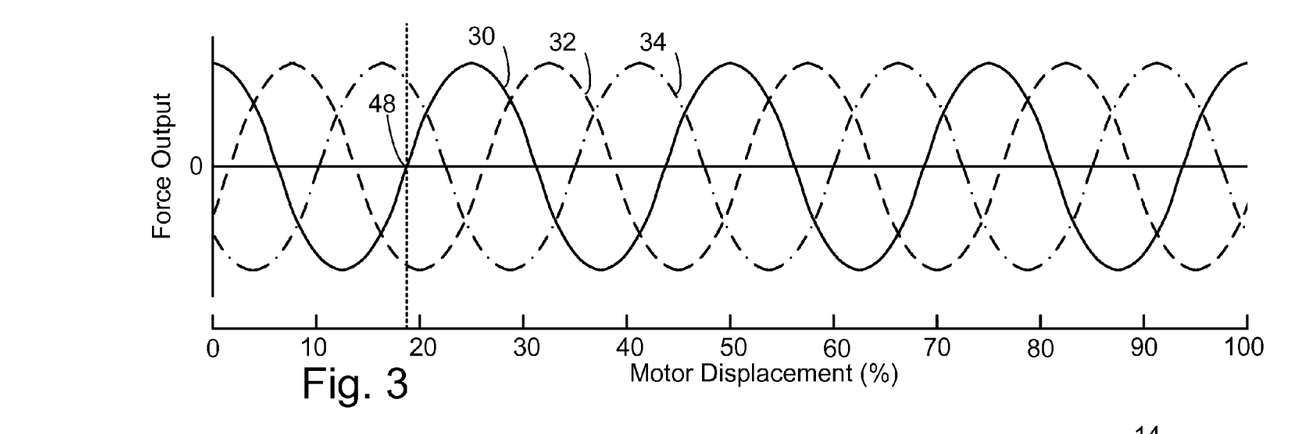
FIG. 3 is a plot of force output vs. motor displacement for a three phase motor.

Proper calibration of the motion control system and accurate position information is particularly important if the power consumption of, or the heat produced by, the motion control system is important. Most motors transduce electrical energy to motion by the interaction of the magnetic field associated with electrical current in a coil with the magnetic field of a permanent magnet structure. Some relative positions between the coil and the permanent magnet structure result in no electrical energy being transduced to motion (hereinafter referred to as "zero force positions"). For example, FIG. 2 shows force output and relative displacement between a coil and a magnet structure of a motor. At points 28, when current is applied to the coil, no electrical energy is transduced to mechanical force. It is disadvantageous to direct current to the coil when the coil and magnet structure are at a zero force position, because the current causes no force and is dissipated as heat, reducing the efficiency of the motor. One method of avoiding or limiting the number of zero force positions is to use a multi-phase motor. A multi-phase motor typically includes more than one coil, with the coils placed linearly (in a linear motor) or radially (in a rotary motor) so that if one of the coils is at a zero force position, at least one other coil is not at a zero force position. The current is switched (commutated) among the windings so that more current is applied to coils that are not at a zero force position. For example, FIG. 3 shows the force output of three coils (curves 30, 32, and 34) when supplied with a constant current irrespective of displacement. At point 48, the coil represented by curve 30 is at a zero force position, but the coils represented by curves 32 and 34 are not at zero force positions, so at point 48, more current could be applied to one or both of the coils represented by curve 32 and 34 than is applied to the coil represented by curve 30. If position information is inaccurate, the wrong amount of current can be applied to the various coils, causing the motor to operate inefficiently.

A motor with three independently energizable coils is referred to as a three phase motor. In a linear motor, the three coils are typically positioned equidistant from each other and so that the coils alternate along the length of the linear motor. In a rotary motor, the three coils are typically displaced angularly so that the three coils differ in phase. The current is commutated between the three coils, as indicated schematically in FIG. 1 by the three lines between amplifier 26 and motor 12. In practice, for a three phase motor, it is necessary to control the current to only two of the three phases. Since the sum of the currents to the three phases is zero, controlling the current to two phases controls the current to the third phase.

Figure 4:
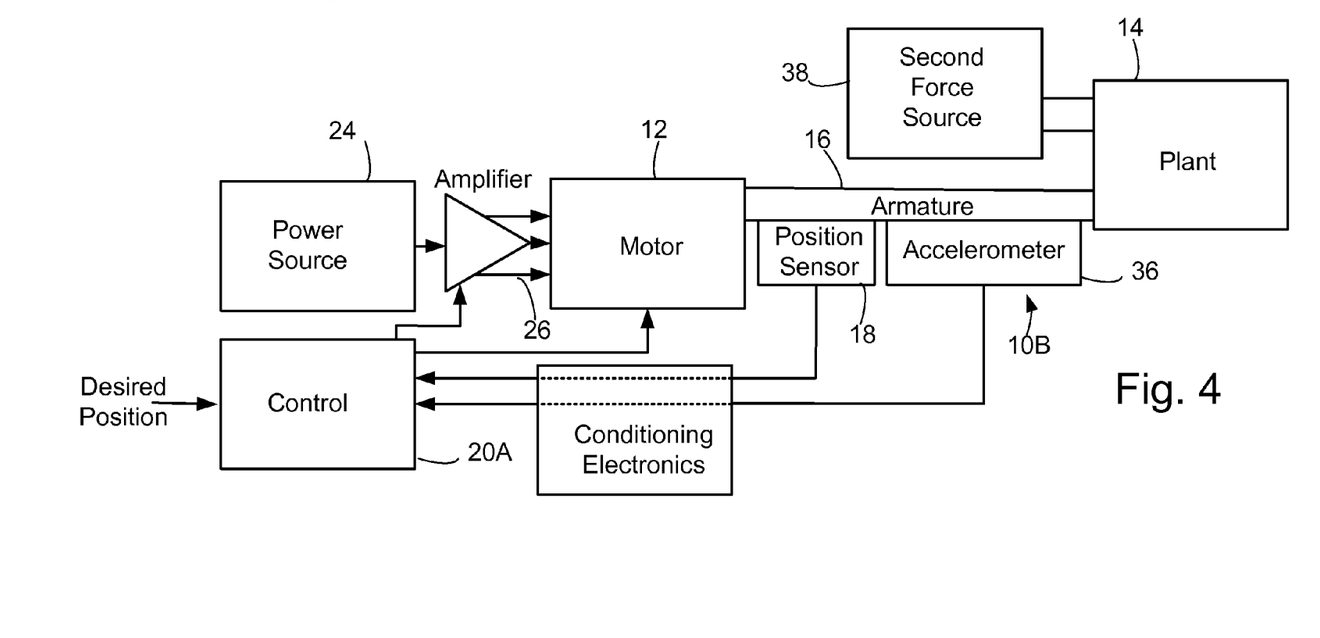
FIG. 4 is a block diagram of a motion control system.

A motion control system including the elements of the system of FIG. 1 and including some additional elements is shown in FIG. 4. The additional elements provide information for calibrating the position sensing, processing, and transmission elements or for causing the system to operate more efficiently or both. The motion control system 10B of FIG. 4 includes the elements of FIG. 1 and in addition includes a second force source 38. The accelerometer 36 is physically coupled to the armature 16 as shown or to the plant 14 to measure the acceleration of the armature or plant and is also operationally coupled to the control block 20A to provide information to the control block. The second force source 38 is physically coupled to the plant 14 to apply force to the plant to cause the plant to move. The second force source 38, the plant 14, the motor 12, and the armature 16 are arranged so that motion of the plant caused by the second force source 38 causes corresponding motion of the armature 16. Ideally, the system is configured and dimensioned so that motion of the plant caused by the second force source 38 causes the armature 16 to move through its entire range of motion.

Figure 5A:
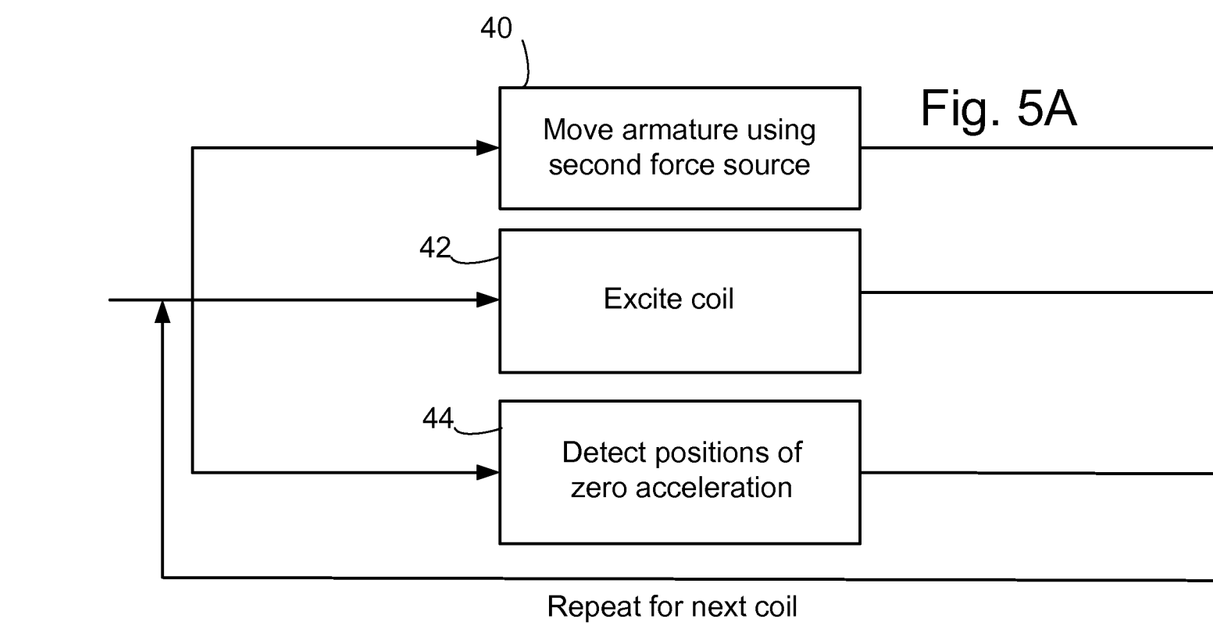
FIG. 5A is a block diagram of a process for detecting zero force positions.
Figure 5B:
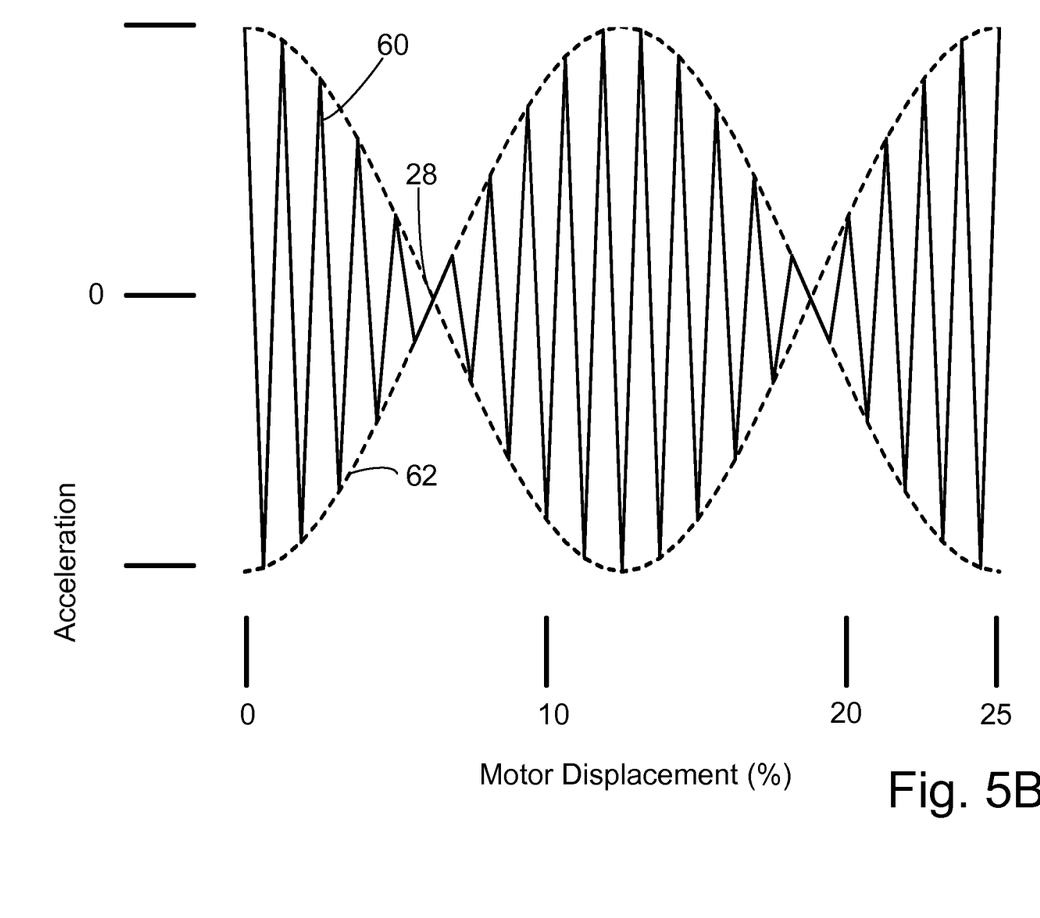
FIG. 5B is a plot of acceleration vs. motor displacement.

A process for operating the system of FIG. 4 to detect zero force positions is shown in FIGS. 5A and 5B. As shown in FIG. 5A, at block 40, the plant 14 is moved by the second force source to cause corresponding motion of the armature 16, preferably through the armature's entire range of travel. The force is applied at a relatively low frequency (which could be essentially zero) and the force could be sufficient to move the armature at a constant velocity. Concurrently with block 40, at block 42 a coil of motor 12 is excited by an excitation signal with known frequency content, as will be explained below. Concurrently with blocks 40 and 42, at block 44, the zero acceleration positions are detected by the accelerometer. The zero acceleration positions correspond to zero force positions. The zero force positions can then be used to calibrate the system or to increase motor efficiency, or both. Ideally, the armature is moved through its entire range of motion so that all zero force positions of the armature are detected.

FIG. 5B shows the output of the accelerometer 36 during the process of FIG. 5A, with the coil being excited having the force output and displacement characteristics illustrated in FIG. 2. For simplicity, the curve of FIG. 5B is only shown from zero through 25% displacement. The portions of the curve between 25% displacement and 50% displacement, between 50% displacement and 75% displacement, and between 75% displacement and 100% displacement, are, respectively, substantially identical to the curve of FIG. 5B. Curve 60 represents the accelerometer output. When the armature (which in this example includes the magnet structure) is at 0% displacement, exciting the coil at step 42 of FIG. 5A results in high maximum force on the armature and therefore high maximum accelerometer output. As the armature is moved by the second force source, exciting the coil results in less maximum force on the armature and therefore less maximum acceleration, as indicated by the accelerometer output envelope 62. The maximum accelerometer output decreases until at point 28 (a zero force position), the maximum accelerometer output is substantially zero, and the position is recorded as a zero acceleration position at step 44 of FIG. 5A. In an actual implementation, the maximum acceleration may not be exactly zero; some very small amount of parasitic acceleration may be detected, resulting from, for example, the structure having some mechanical resonance. One method of approximating when the accelerometer output is zero includes determining the derivative of the acceleration. When the acceleration is small and derivative of the acceleration changes sign, the acceleration is substantially zero.

In one implementation in which the plant 14 is a vehicle seat, the excitation signal may be a 500 Hz sine wave. The frequency content of the excitation signal does not need to be a single frequency, but may be a sweep or filtered noise. If the frequency content of the excitation signal is outside the normal range of operation of the motion control system, the motion control system can discriminate between motion that is responsive to the excitation signal and motion that is responsive to normal operation of the motion control system. The frequency of the excitation signal should be within the operational capabilities of the system; for example, the motion control system should be capable of moving the armature at the frequency of the excitation signal, and if the motion control system includes digital signal processing, the frequency should satisfy the Nyquist sampling criterion. If the excitation frequency is within the audible range of frequencies, vibration in response to the excitation signal will be audible. Additional criteria for the excitation signal frequency are set forth below in paragraph.

If the second force source is a component of the motion control system (for example, if the motion control system is an active vehicle seat suspension and the second force source a controllable air spring, or if the motion control system controls vertical position and the second force source is gravity), the system of FIG. 4 can be self-calibrating, or the determination of zero force positions and the calibration of system components such as the position sensor can be performed without expensive motion control calibration equipment.

Figure 6:
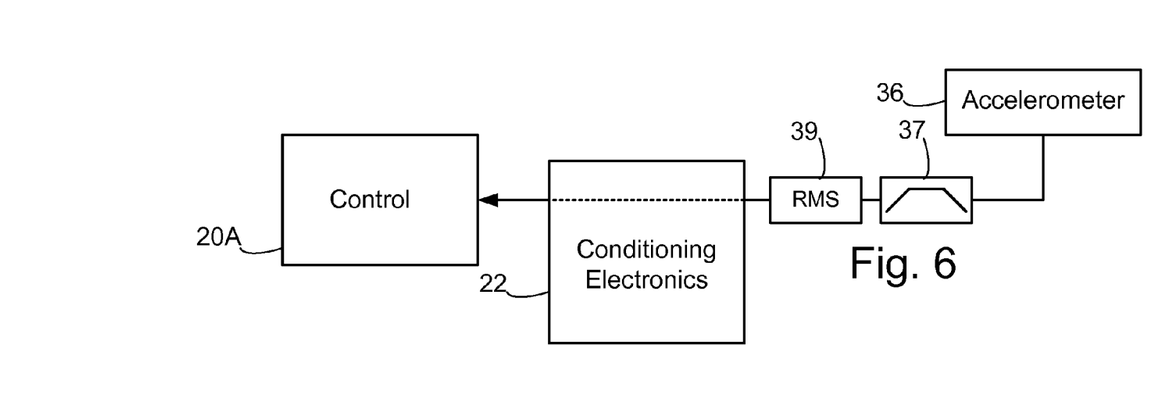
FIG. 6 is a block diagram of a portion of a motion control system.

FIG. 6 shows a portion of the motion control system of FIG. 1 or 4, with additional elements band pass filter 37 and RMS calculator 39 to calculate the RMS value of the filtered acceleration measurement. The RMS calculator 39 and band pass filter 37 are typically implemented as digital signal processing devices and are shown in FIG. 6 as separate blocks. In an actual implementation, the digital signal processing device incorporating the RMS calculator 39 and band pass filter 37 may be stand alone processors, may be combined into a single processor, or may be integrated with a processor associated with the accelerometer 36, the conditioning electronics 22 or the control block 20A.

Figure 7:
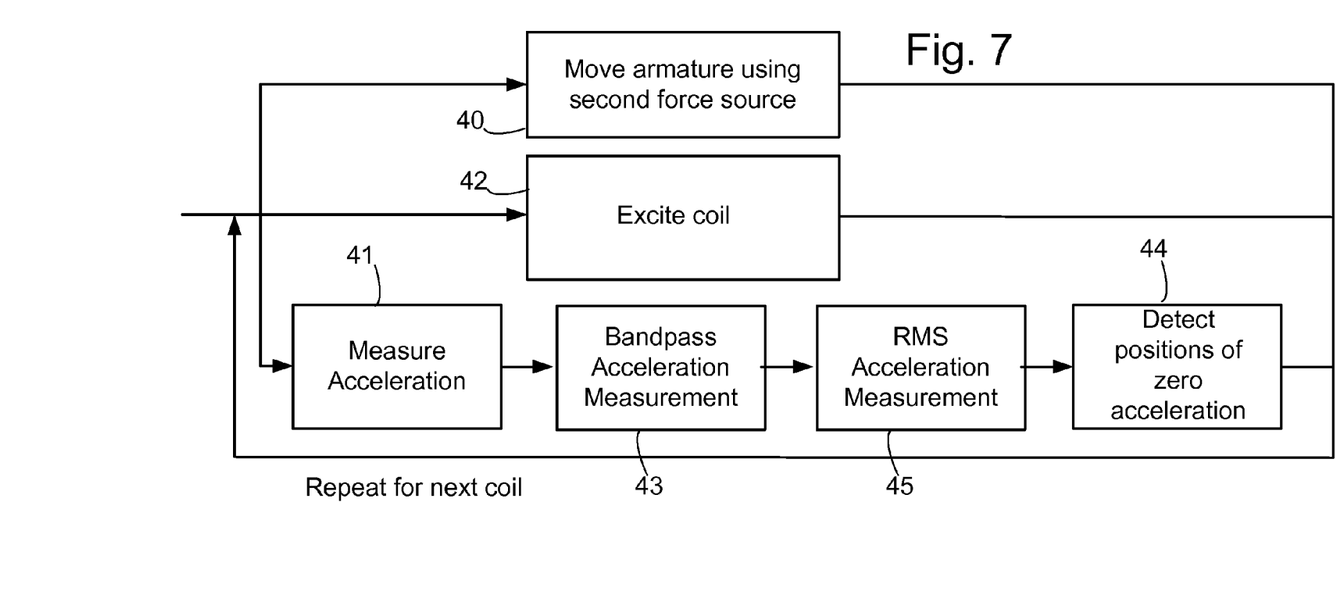
FIG. 7 is a block diagram of a process for detecting zero force position.

FIG. 7 shows a process for operating a motion control system having the elements of FIG. 4 as modified by FIG. 6 to discriminate between the effect of the force applied by the secondary force source and the effect of the excitation of the coil. Referring to FIGS. 1, 4, and 7, at block 40, the plant 14 is moved by the second force source to cause corresponding motion of the armature 16. Ideally, the motion is at a constant velocity, or alternatively, the force is applied by the second force source at a low frequency, for example, 0.5 Hz. Concurrently with block 40, at block 42 a coil is excited with a signal of known frequency content, for example a sine wave with a frequency of 500 Hz. Concurrently with blocks 40 and 42, at block 41, the acceleration of the armature is measured; at block 43, the accelerometer output is filtered with a passband encompassing the known frequency content. At block 45, the RMS value of the filtered accelerometer output is calculated. And at block 44, the zero acceleration points are detected. The zero acceleration positions correspond with zero force positions. The zero force positions can then be used to calibrate the system or to increase motor efficiency, or both. Ideally, the armature is moved through its entire range of motion so that all zero force positions of the armature are detected.

In one implementation, the motion control system of FIGS. 1 and 4 is an active vehicle seat suspension system similar to the active vehicle seat suspension described in US Patent Application Publication US2006/0095180 (hereinafter '180) published May 4, 2006. The motor 12 and armature 16 may be a three phase linear actuator. The plant 14 may be the seat 16 of '180. The position sensor 18 may be the vertical position sensor 24 of '180. The second force source 38 may be an air spring or air cylinder with an associated reservoir as shown in FIG. 14 of '180 and described in the corresponding portions of the specification, for example at paragraphs. In other active seat suspension systems, the second force source could be gravity.

The motion control system of FIGS. 1 and 4 can be used in a variety of applications. Some applications are described in '180 at paragraphs. For example, the plant can include a seat, a passenger, any fixtures associated with the seat, the seat's support structure, or power electronics. The plant can be an engine mount, a platform on a boat, as seat, bed, or cab used in any moving vehicle such as a car truck, boat or other watercraft, train, bus, recreational vehicle, ambulance, tractor, truck-trailer, farm machinery, construction machinery, weapons platform, airplane, helicopter or other aircraft, a personal transportation device, such a wheelchair, or baby carriage. Other examples could include a machine tool isolation table, interferometer benches, photolithography tables, and the like. The plant could be a bed for sleeping, or a suitable device to transport cargo that is fragile or explosive.

Figure 8:
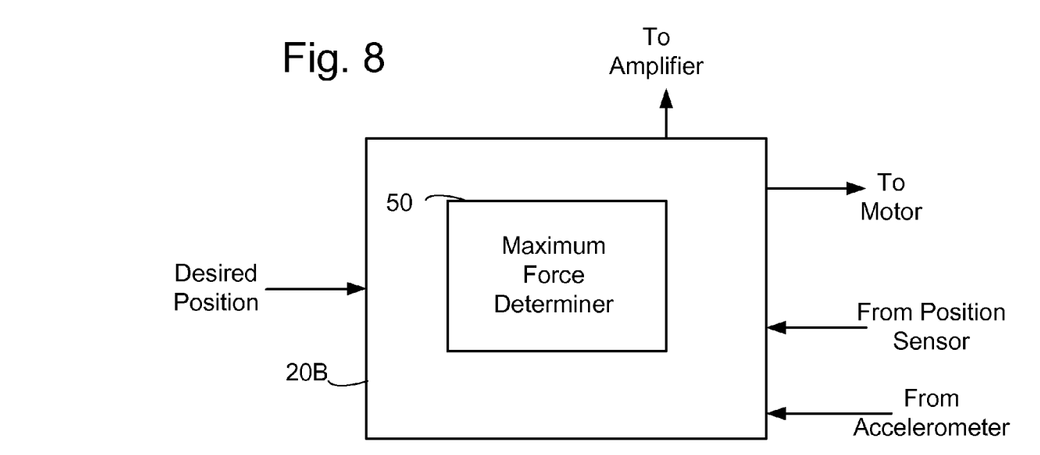
FIGS. 8-10 are block diagrams of a component of a motion control system.

Referring again to FIG. 3, at each armature position (designated in FIG. 3 as a percentage of total motor displacement; for a rotary motor each armature position could be designated in degrees or radians), the force outputs of the three phases differ in amplitude, and may also differ in direction (with force outputs >0 representing force exerted in one direction and force outputs <0 representing force in the opposite direction). For each position, there is a commutation pattern (that is a pattern of currents) to the three phases that results in maximum combined force output for the three phases. FIG. 8 shows a control block 20B similar to the control block 20A of the motion control system of FIG. 1 or 4, with an additional element, namely a maximum force determiner 50.

As described above in the discussion of FIG. 1, in conventional operation (referring to FIGS. 1, and 8), the control block receives as input a desired position, and, from the position sensor 18 an actual position of the plant 14 or the armature 16. The control block 20B determines a motion that will cause the actual position to match the desired position and determines the force required to effect the motion. The control block transmits control signals to the amplifier 26, the motor 12, or both, to cause the motor to apply the desired force.

In a motion control system with the maximum force determiner 50 of FIG. 8, the control system determines a commutation pattern resulting in maximum force for the position indicated by the position sensor, and transmits a commutation control signal to the amplifier, the motor, or both, to apply the desired force according the maximum force commutation pattern.

In an actual implementation, the maximum force determiner 50 may comprise calculating circuitry, but more conveniently is a look up table (LUT). In many systems, the maximum force determiner can be implemented as a minimum current determiner that determines a commutation pattern that results in the minimum current to achieve a desired force.

Figure 9:
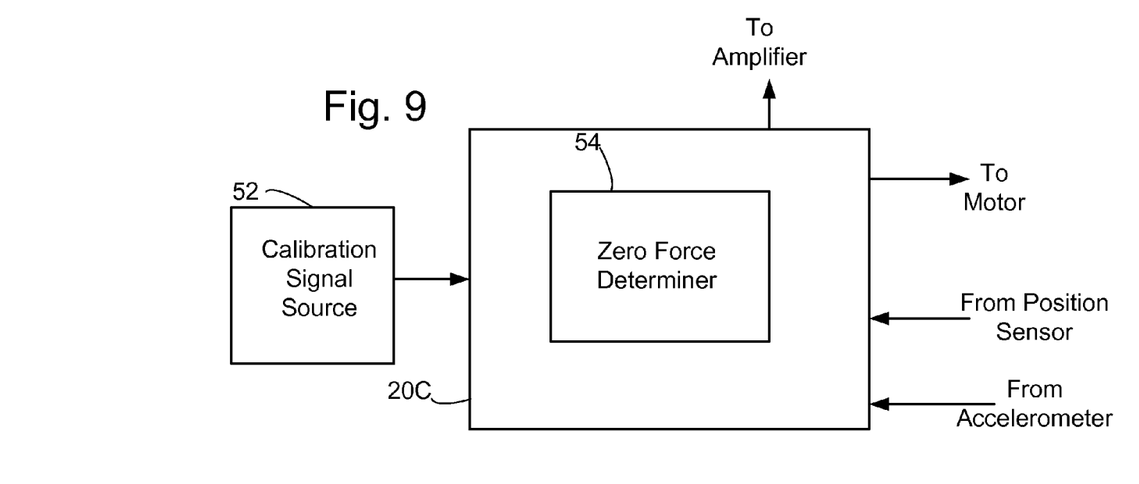

Referring again to FIG. 3, at each armature position (designated in FIG. 3 as a percentage of total motor displacement; for a rotary motor each armature position could be designated in degrees or radians), the force outputs of the three phases differ in amplitude, and may also differ in direction (with force outputs >0 representing force exerted in one direction and force outputs <0 representing force in the other direction). For each armature position, there is a commutation pattern (that is a pattern of currents) to the three phases that results in zero combined force output for the three phases. FIG. 9 shows a control block 20C similar to the control block 20A of FIG. 1 or 4 with additional elements calibration signal source 52 and zero force determiner 54.

In operation (referring to FIGS. 1, 4, and 9), the control block 20C receives from calibration signal source 52 a calibration signal including instructions to cause the motor to exert a force. The force is applied at a frequency or range of frequencies as discussed above. The zero force determiner determines a commutation pattern that would result in the motion control system exerting zero force if the position sensed by the position sensor 18 is accurate. The accelerometer 36 detects acceleration resulting from force applied in response to the calibration signal. If the frequency of the calibration signal is in the audible range of frequencies, motion may be detectable by a microphone or may be audible to a user of the motion control system. If the position as determined by the position sensor is accurate, there is no net force at the predetermined frequency pattern, and therefore no acceleration, and therefore no motion, resulting from the calibration control signal. However, if the position as determined by the position sensor is not accurate, some force will be exerted by the motion control system, resulting in motion that is detected by the accelerometer. The process can be repeated, with an offset or adjustment to the position as determined by the position sensor until no motion is detected, thereby calibrating the position sensor with the other elements of the motion control system.

Typically, the zero force commutation pattern is the maximum force commutation pattern, displaced by 90 electrical degrees. The zero force determiner 54 may comprise calculation circuitry, but may also be an LUT. The calculating or look-up process may be done by a standalone processor or may be done by a processor associated with other functions of the control block 20C or the conditioning electronics 22. The calibration signal source is most conveniently a signal source that causes the motion control system to exert force according to a known frequency pattern. The frequency pattern may be a single frequency, preferably outside the normal range of operation of the motion control system, preferably with no system resonances at nearby frequencies. Additionally, particularly if the calibration system is operated during normal operation of the motion control system, the frequency should be outside the range of operation of the motion control system so that the calibration signal does not result in motion of the armature that is similar in amplitude or frequency of motion that the motion control system is designed to counteract. Also, the frequency of the calibration signal should not be a frequency that annoys or discomforts a passenger (such as a frequency that causes motion sickness). In one embodiment, the calibration signal is a 500 Hz sine wave. Additional desirable features of the frequency content of the calibration signal are stated above in paragraph [0014].

Figure 10:
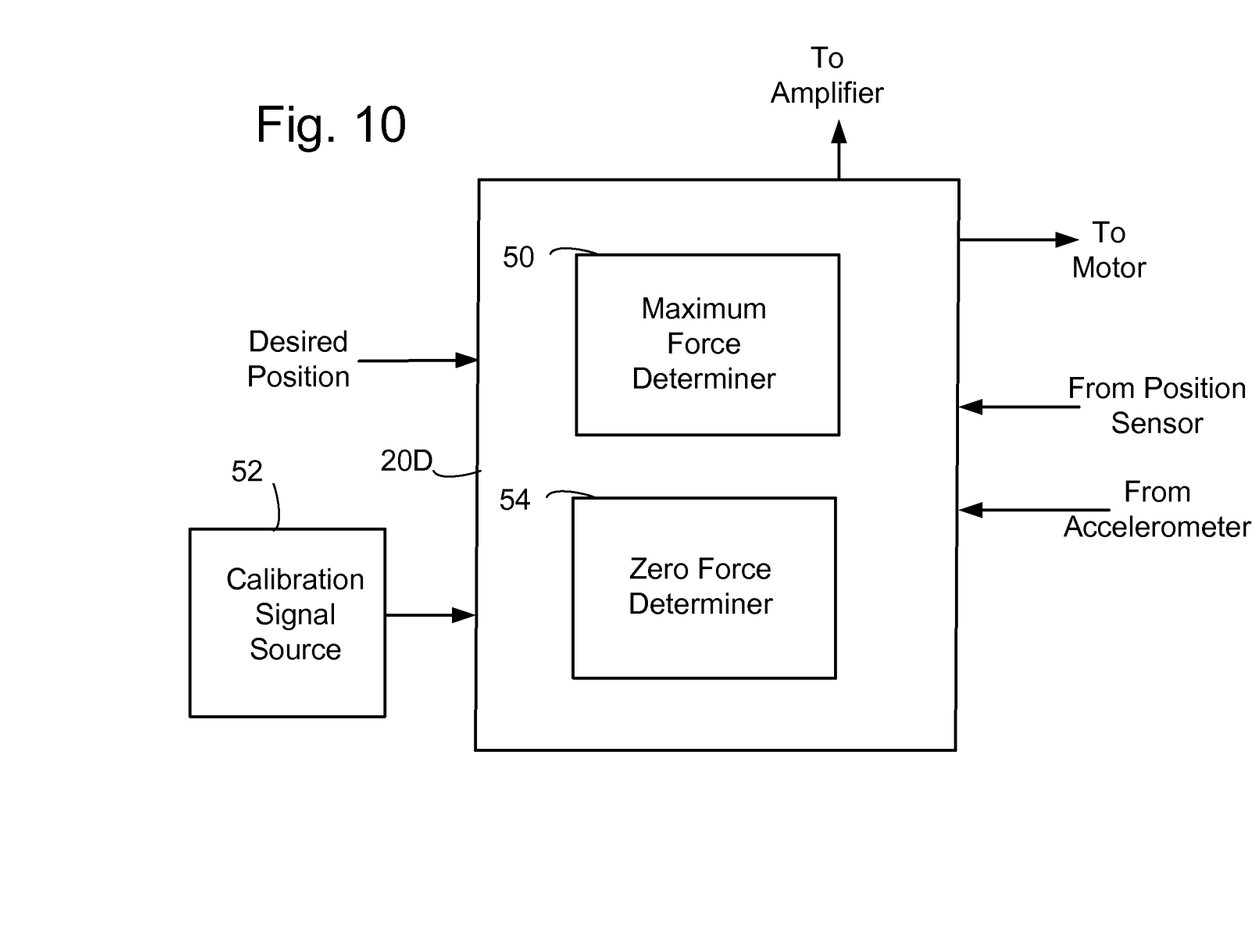

FIG. 10 shows a control block 20D similar to the control block 20A of FIG. 1 or 4 with the maximum force determiner 50 of FIG. 8 and with the calibration control signal source 52 and the zero force determiner 54 of FIG. 9. A motion control system with the control block 20D can calibrate the motion control system whenever the power source 24 can provide power, even during normal operation of the motion control system. If the motion control system is calibrated during normal operation of the system, motion corresponding with the frequency pattern of the calibration control signal indicates that the position indicated by the position sensor is not accurate. A motion control system according to FIG. 10 can include the RMS calculator 37 or the band pass filter 39 (or depending on the frequency range of the calibration signal, a high or low pass filter) of FIG. 6 to determine if there is any motion resulting from the calibration control signal. Calibration can be performed at predetermined intervals or upon the occurrence of predetermined events, such as when the system is turned on.

Figures 11A, 11B:
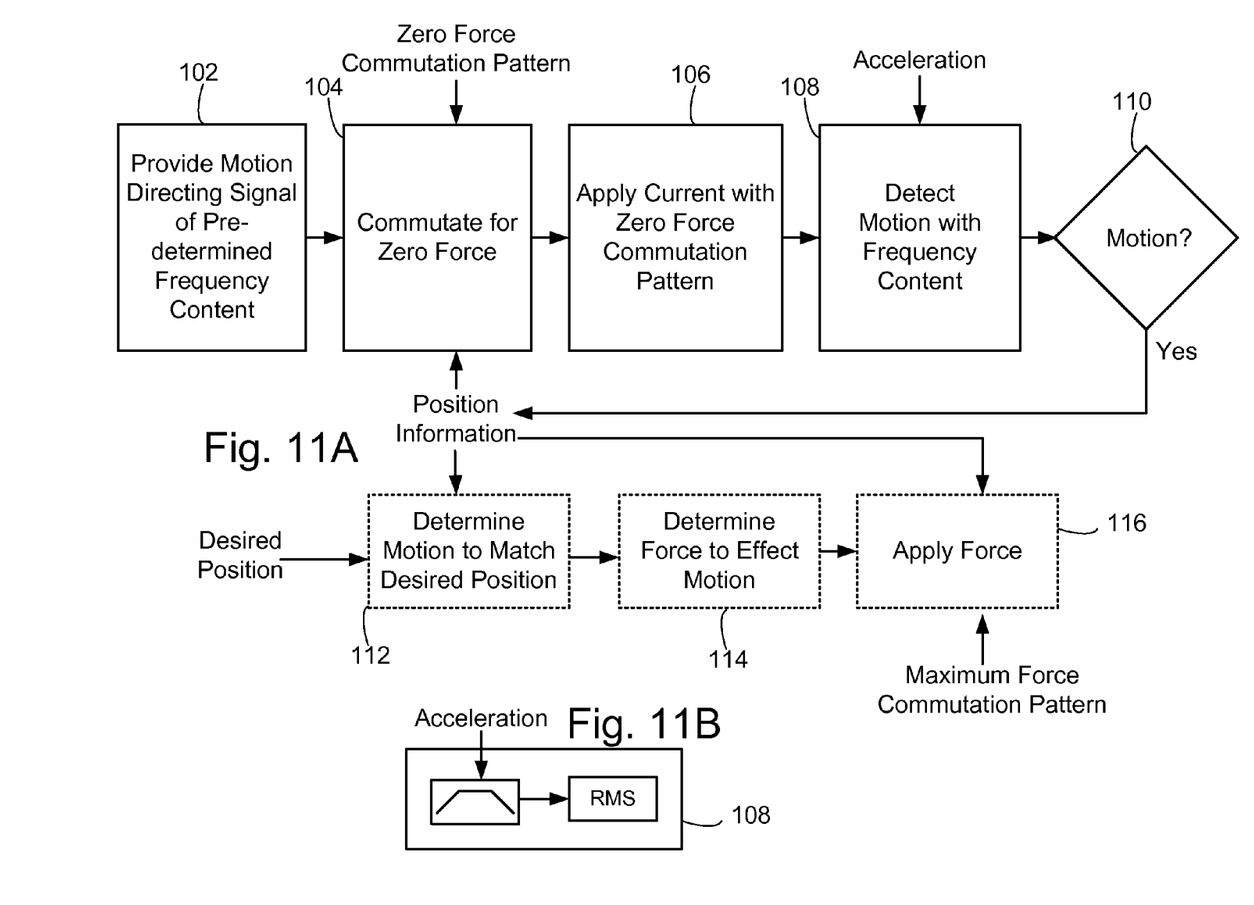
FIG. 11A is a block diagram of a process for calibrating a motion control system.
FIG. 11B is a block of the block diagram of FIG. 11A showing greater detail.

FIG. 11A shows a process for self-calibrating a motion control system. At block 102, a motion directing signal having pre-determined frequency content is provided. At block 104, position information is received from the position sensor 18 of FIG. 1 or 4 and, based on the position information, a zero force commutation pattern is received from zero force determiner 54 of FIG. 9 or 10. At block 106, current is applied to the phases of the motor according to the zero force commutation pattern. At block 108, the acceleration is received from the accelerometer of FIG. 1 or 4, and it is determined at block 110 if there is motion with the frequency content of the motion directing signal. If there is motion, the positional information is modified and blocks 104, 106, 108 and 110 may be repeated with the modified position information until there is no motion with the frequency content of the motion direction signal. FIG. 11A also illustrates that the self-calibration can be performed while the motion control system is performing conventional operation. Conventional operation is indicated by blocks with dashed lines. As described above in paragraph, at block 112, position information (from the position sensor 18 of FIG. 1 or 4) and a desired position are received and the motion appropriate to cause the actual position to match the desired position in determined. At block 114, the force required to effect the appropriate motion is determined. At block 116, the force is applied by directing current, preferably according to the maximum force commutation pattern corresponding with the position information received from the position sensor of FIG. 1 or 4. The maximum force commutation pattern may be received from maximum force determiner 50 of FIG. 8 or 10.

FIG. 11B shows that the detecting motion with the frequency content of the motion directing signal can include band passing (or high or low passing, depending on the frequency content) the acceleration signal and determining the RMS value of the filtered acceleration signal.

A self-calibrating motion control system operated according to FIG. 11A is particularly advantageous for motion control systems in which it is desirable for any of the elements of the motion control system, for example, the control block 20C or 20D, the position sensor 18, the amplifier 26, the motor 12 and armature 16, or the conditioning electronics 22 to be replaced independently of the other elements. The functionality of control blocks 20C or 20D permits the motion control system to self calibrate when a component is replaced. With conventional motion control systems, if any one component is replaced, the entire motion controls system must be recalibrated, typically at a factory, by a skilled technician, using expensive and specialized fixtures and measuring equipment.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method for self-calibrating a motion control system for responding to motion within a range of frequencies, comprising:
   providing, by a position detector associated with the motion control system position information, within an intended range of motion, of an armature;
   providing a motion directing calibration signal of a known frequency content, to cause the motion control system to provide current to a plurality of coils of a multiphase motor, the multiphase motor comprising the coils, a magnetic structure, the armature and a plurality of phases, each of the phases corresponding to one of the plurality of coils;
   commutating current provided to the plurality of coils so that the net force resulting from an interaction of the current in the plurality of coils with the magnetic structure with the known frequency content is zero if the actual position of the armature corresponds to the position information as provided by the position detector; and
   detecting motion, at the pre-determined frequency, of the armature resulting from the motion directing signal.

2. A method for calibrating a motion control system according to claim 1, wherein the predetermined frequency content comprises frequencies outside the range of frequencies.

3. A method for calibrating a motion control system according to claim 1, wherein the detecting comprises filtering an acceleration measurement according to the known frequency content.

4. A method for calibrating a motion control system according to claim 1, further comprising:
   in the event that that motion resulting from the armature is detected, modifying the position information.

5. A method according to claim 1, wherein the detecting comprises measuring the acceleration of the armature.

6. A method according to claim 1, further comprising:
   simultaneously operating the motion control system in a conventional manner, the conventional manner comprising
   receiving as input a desired armature position;
   determining a motion that will cause the position indicated by the position information to match the desired armature position;
   determining a force required to effect the motion; and
   applying the required force to the armature.

7. A method for self-calibratinq a motion control system, comprising:
   providing, by a position detector associated with the motion control system position information of an armature;
   providing a motion directing calibration signal of pre-determined frequency content, to cause a motion control system to provide current to a plurality of phases of a multiphase motor, the multiphase motor comprising the armature;
   commutating current provided to the plurality of phases so that the net force with the pre-determined frequency content is zero if the actual position of the armature corresponds to the position information; and
   detecting motion at the pre-determined frequency, of the armature resulting from the motion directing signal, wherein the detecting comprises detecting audible vibration resulting from motion of the armature.

8. A self-calibrating motion control system comprising:
a motor comprising a magnetic structure, an armature and a plurality of coils, each of the plurality of coils corresponding with a phase of a plurality of phases of the multiphase motor;
a position sensor to provide position information of the armature;
a calibration signal source to provide a signal directing a motion control system to provide current to the plurality of coils;
a commutator to commutate current provided to the plurality of phases so that the net force resulting from an interaction of the magnetic structure and the current in the coils is zero if the actual position of the armature corresponds to the position information; and
a motion detector to detect motion of the armature resulting from the motion directing signal.

9. A self-calibrating motion control system according to claim 8, further comprising circuitry to modify the position information, and wherein the commutator is further to commutate current provided to the plurality of coils so that the net force resulting from the plurality of phases is zero if the actual position of the armature corresponds to the modified position information.

10. A self-calibrating motion control system according to claim 8, wherein the motion detector comprises an accelerometer.

11. A calibration device for use in a motion control system according to claim 8, further comprising circuitry to modify the position information and wherein the commutator is further to commutate current provided to the plurality of coils so that the net force resulting from the plurality of phases is zero if the actual position of the armature corresponds to the modified position information.

12. A self-calibrating a motion control system comprising:
a motor comprising an armature and a plurality of phases;
a position sensor to provide position information of the armature;
a calibration signal source to provide a signal directing a motion control system to provide current to the plurality of phases;
a commutator to commutate current provided to the plurality of phases so that the net force resulting from the plurality of phases is zero if the actual position of the armature corresponds to the position information; and
a motion detector to detect motion of the armature resulting from the motion directing signal, wherein the motion detector comprises a microphone.

13. A method comprising:
applying, at a first frequency, a force to an armature of a motor to move the armature through a range of positions;
determining, by a position sensor, an indicated position of the armature;
exciting, at a frequency higher than the first frequency, a coil of the motor;
measuring the acceleration of the armature;
filtering the acceleration of the armature to obtain a filtered acceleration measurement;
determining when the filtered acceleration measurement is zero; and
when the filtered acceleration measurement is zero, recording the indicated position.

14. A method according to claim 13, wherein the applying is performed by a linear actuator.

15. A method according to claim 13, wherein the exciting is performed by a first force source and the applying is performed by a second force source.

16. A method according to claim 15, wherein the second force source is gravity.

17. A method according to claim 13, wherein the filtering comprises band pass filtering.

18. A method according to claim 13, further comprising calculating the root mean squared value of the acceleration.

19. A method according to claim 13, wherein the force is applied to a plant mechanically coupled to the armature.

20. A method according to claim 13, further comprising commutating the motor responsive to the measuring.

21. A method according to claim 13, wherein the determining when the filtered acceleration measurement is zero comprises determining when the derivative of the filtered acceleration measurement changes sign.

22. A method comprising:
applying, at a first frequency, a force to an armature of a motor to move the armature through a range of positions;
determining, by a position sensor an indicated position of the armature;
exciting, at a frequency higher than the first frequency, a coil of the motor;
measuring the acceleration of the armature;
filtering the acceleration of the armature to obtain a filtered acceleration measurement;
determining when the filtered acceleration measurement is zero; and
when the filtered acceleration measurement is zero, recording the indicated position, wherein the method is implemented in an active vehicle seat suspension.

23. A method according to claim 22, wherein the force is applied by an air spring.

24. A motion control apparatus comprising:
a motor, comprising an armature and a coil;
a force source, distinct from the motor, for applying to the armature at a first frequency a force for moving the armature through a range of motion;
wherein the at least one coil is excited at a frequency higher than the first frequency;
a position detector, for detecting the position of the armature;
an accelerometer, for providing a measurement of the acceleration of the armature;
a filter, for filtering the measurement; and
circuitry for associating a detected position with an acceleration measurement of zero.

25. A motion control apparatus according to claim 24, further comprising a plant mechanically coupling the force source and the armature.

26. A motion control apparatus according to claim 24, wherein the filter is a band pass filter.

27. A motion control apparatus according to claim 24, further comprising circuitry for calculating the root mean squared value of the measurement of the acceleration.

28. A motion control apparatus according to claim 24, wherein the motor is a multiphase motor.

29. A motion control apparatus according to claim 28, further comprising commutating circuitry for commutating the motor responsive to the acceleration measurement.

30. An active vehicle seat suspension system, comprising:
a vehicle seat;
an actuator for controlling the motion of the vehicle seat, the actuator comprising an armature;
a position detector to provide position information of the armature; and
a self-calibration system for the active vehicle seat suspension system comprising a force source independent of the actuator to move the vehicle seat;

a current source to provide current to the actuator at a predetermined frequency;

a commutator to commutate the current so that the if the position information is accurate, the actuator applies a predetermined amount of force, and an accelerometer for measuring the acceleration of the armature; and a filter, for filtering the acceleration of the armature.

31. An active vehicle seat suspension system according to claim 30, wherein the predetermined amount of force is zero.

* * * * *